Oct. 8, 1968　　　　　　H. E. MORTER　　　　　　3,405,030
METHOD OF DETERMINING AND CONTROLLING MICROBIAL
ACTIVITY IN AQUEOUS PAPER MACHINE SYSTEMS
Filed May 20, 1965
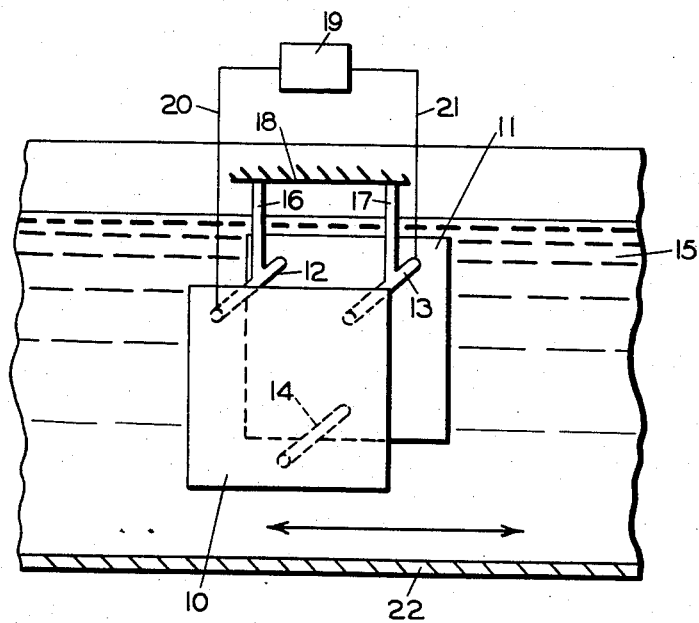
INVENTOR.
HARRY E. MORTER
BY Robert E. Howard
ATTORNEY

3,405,030
**METHOD OF DETERMINING AND CONTROL-
LING MICROBIAL ACTIVITY IN AQUEOUS
PAPER MACHINE SYSTEMS**
Harry E. Morter, Port Townsend, Wash. 98368
Filed May 20, 1965, Ser. No. 457,365
2 Claims. (Cl. 162—161)

ABSTRACT OF THE DISCLOSURE

A procedure for controlling the growth of slime and other microorganisms in the water system of a paper machine where spaced electrodes are inserted into the flow system of the machine, the electric current produced between the electrodes is measured, and in response to a current measurement corresponding to microorganism activity in the system at a predetermined intolerable level adding chemical toxicant to the system effective to control such microorganism activity.

---

This invention relates to a method of determining and controlling microbial activity in aqueous systems by the use of spaced electrodes inserted into the system.

It has been found that microbial activity in aqueous systems may be measured and controlled by inserting one or more pairs of electrodes into the liquid comprising the system, and adding a chemical toxicant to the system when the electric potential or current generated between the electrodes reaches a predetermined level corresponding to intolerable microorganism activity. Part of this electrical potential or current that is generated between the electrodes is due to the oxidation-reduction reaction that takes place whenever a pair of metallic electrodes are placed into a liquid medium. Part of the electric potential or current, however, is believed to be directly related to the activity of microorganisms present in the system. Thus, for any given aqueous system there is an environmental or datum potential or current generated between electrodes inserted therein due to the action of the liquid itself. There is also a potential or current generated which is believed to be due to the presence of any microorganisms. If the composition of the liquid in the system remains constant, any differences in potential or current observed at different times is believed to be due at least in part to differences in microorganism activity. For a particular aqueous system, potential or current readings may be correlated with conditions indicating intolerable microbial activity. When this potential or current is reached, chemical toxicant may then be added to the system. Thus, unnecessary toxicant addition is avoided, and necessary toxicant addition is indicated.

It is to be emphasized that differences in potential or current readings from the datum with time for a given aqueous system may be due at least partly to factors other than microorganism concentration. Whatever the reason for these differences, they have been found to correlate with microbial activity so that differences in potential or current are directly related to microbial activity.

An understanding of the invention will be facilitated by the following detailed description and by reference to the accompanying drawings in which the figure is a perspective view of the electrode system of this invention.

Briefly, the method of my invention comprises inserting a pair of spaced electrodes into an aqueous environment containing microorganisms to be controlled, periodically measuring the electric potential or current produced by means of these spaced electrodes, and, in response to a potential or current measurement, adding effective amounts of chemical toxicant to the liquid environment. The electrodes employed may consist of a single pair or several pairs of electrodes connected together.

Referring now to the figure, electrodes 10 and 11, spaced apart by non-conducting dowels 12, 13 and 14, and suspended in liquid medium 15 by supports 16 and 17 extending from support member 18, are connected to measuring device 19 by conductors 20 and 21. The measuring device 19 may be a potentiometer or ammeter, and may be of the recording or nonrecording type. The electrodes are immersed in a static liquid system such as a tank, or in a dynamic liquid system such as in a sluice or in a pipeline with the direction of flow of the liquid being parallel to the plates as indicated by the arrows in the drawing. Reference numeral 22 merely indicates the bottom of whatever vessel is employed whether it be a tank, sluice or a pipe.

Electrodes 10 and 11 may be constructed of the same metal or different metals, or one of the electrodes may be a calomel electrode. However, it has been found that if the same metal is used for both electrodes, a reversal of polarity is frequent. Therefore, in order that the polarity is always the same, the electrodes are preferably constructed of different metals. The more anodic of the two metals is connected to the anode of the potentiometer. For example, it has been found that a useful electrode pair is stainless steel and bronze due to the high corrosion resistance of these materials. Since stainless steel is more anodic than bronze, it is connected to the anode terminal of the measuring device and is the electrode designated 10 in the drawings. The bronze electrode is connected to the cathode of the measuring device and is the electrode designated 11 in the drawing. The electrodes may be solid metal plates or metal mesh. The size of the electrodes is not critical. Electrodes ranging in size from about 2 inches by 2 inches to about 9 inches by 9 inches have been employed. The electric potential generated between the two electrodes is independent of electrode size.

Dowels 12, 13 and 14 may be made of any non-conducting material, such as Bakelite. While three such dowels have been illustrated in the drawing, the number is not critical. The length of dowels 12, 13 and 14 determine the distance apart electrodes 10 and 11 are held with respect to each other. The electrodes should not be so close to each other that they touch, and they should not be so far apart that no potential measurements may be taken. The optimum distance depends upon the liquid growth medium, the electrode materials, and other environmental factors, and may be easily determined for each such system.

Support members 16 and 17 may be made out of any suitable material, either insulating or conducting. In the case of a static liquid environment, the support members may be either flexible or rigid, but in the case of a dynamic liquid system, the support members should preferably be rigid in order to hold the plates parallel to the direction of the flow. While the drawing illustrates only two such support members connected to the Bakelite dowels, there may be more than two employed, and they may be connected to the electrodes themselves. However, in the latter case the support members must be insulating so as not to ground the electrodes.

Conductors 20 and 21 connecting electrodes 10 and 11 with measuring device 19 are preferably insulated. They may be connected to the electrodes 10 and 11 in any suitable manner, such as by the screws (not shown) holding the dowel members 12 and 13 to the electrodes 10 and 11.

The distance into the liquid medium to which the electrodes are immersed is not particularly critical, and, in fact, the electrodes may extend above the surface of the liquid. However, it is preferred that the electrodes be immersed below the surface of the liquid in order that any surface motion of the liquid will not affect the potential reading.

In operation, electrodes 10 and 11 are inserted into a liquid environment in which the microbial activity is desired to be studied or controlled. Potential or current measurements are taken and correlated with microorganism activity in the liquid environment. By observing the activity of the microorganisms in any particular aqueous system, their activity and growth may be easily controlled by adding chemical toxicants to such environments when it reaches an intolerable level as indicated by potential or current measurements.

What constitutes an intolerable level of activity of microorganisms must be determined for each particular system, and depends upon such factors as the types of microorganisms present, the rate of growth of the microorganisms, the nature of the chemical toxicant, the response time for action of the toxicant upon the microorganisms, and others.

The microorganism control system described herein may be employed in any aqueous environment where it is desired to control microbial growth, such as in the water employed in cooling towers or in the stock system of paper machines.

Paper mill water systems recirculate water due to economic and pollution considerations. Such recirculation engenders the problem of slime deposits. Slime deposits are ordinarily combinations of microorganisms and inorganic and organic materials. These materials tend to accumulate and give masses or deposits variously characterized as stringy, pasty, rubbery, tapioca-like, gelatinous, mealy, hard and horny, leathery, beardy, and scaley, which break off, get into the pulp slurry, and cause defects in the paper produced therefrom. It appears from studies of the mechanisms of slime formation that various bacteria are primarily responsible for slime formation, particularly those having fimbriae. Bacterial genera generally found in paper mill slime deposits include Aerobacter, Chromobacterium, Clostridium, Escherichia, Flavobacterium, Klebsiella, Proteus, Pseudomonas, and Serratia. At present, slime formation in paper mill systems is controlled by good housekeeping procedures, and the addition of chemical toxicants to the systems. Such chemical toxicants may be added continuously or intermittently to the paper mill water systems, depending upon the nature of the active ingredient in the toxicant and upon the conditions prevalent in the mill system to which the toxicant is to be added. The addition of such toxicants is highly empirical and the quantities of toxicant added to water systems and the time of addition usually bear no relation to the concentration of microorganisms actually present.

The following example illustrates the use of the system described to control slime microorganisms in the white water system of a paper machine. It is to be understood that this is by way of illustration only, and not limiting upon the scope of the invention.

EXAMPLE

Two pairs of stainless steel and bronze plates 8½ inches by 9 inches spaced 2 inches apart by 1 inch diameter Bakelite dowels were suspended 12 inches apart in the suction box seal pit of a paper machine running on unbleached kraft pulp, 4 to 6 inches below the white water surface. These plates were connected in series, the bronze plate of the first electrode pair being connected to the stainless steel plate of the second electrode pair by No. 20 insulated wire. The stainless steel plate of the first electrode pair was connected by No. 20 insulated wire to the anode terminal of a General Electric differential voltage potentiometric recorder, while the bronze plate of the second electrode pair was connected to the cathode terminal of the recorder. One-fourth inch stainless steel support rods suspended the cell from overhead pipe into the white water. In the suction box seal pit the white water is fast-moving and relatively free of stock. The plates were positioned parallel to the direction of flow of the white water. D.C. potentials of from about 2 or 3 millivolts to about 200 millivolts were recorded. The addition schedule being employed called for the addition of slimicide to the system three times a day at four-hour intervals. During the 4 hours of toxicant addition, the potentiometer recorded a decrease in potential which corresponded to a decrease in microbial activity. During the four-hour period in which no toxicant was being added conditions remained the same or an increase in microbial activity was noted. The toxicant employed was a liquid organo-bromine composition.

After many studies, it was found that slimicide addition according to the schedule just described was not necessary. Slimicides do not have to be added to a system continuously, but need be added only when the microorganism activity reaches a predetermined intolerable level.

For the particular paper machine system upon which these studies were conducted, it was found that a potential of about 80 millivolts, was the upper limit of tolerable microorganism activity and any potential greater than this required the addition of chemical toxicant to the system to prevent detrimental slime formation. Previously, slimicide had been added continuously on the four-hour schedule described above. By employing the slime control system described, slimicide now only has to be added when the potential exceeds 40 millivolts. This, of course, results in quite a large slimicide savings. The use of the system described also permits a more accurate evaluation of slimicides for a particular system.

While in the foregoing example the electrodes were placed into the white water in the suction box seal pit, they may be placed at any suitable place in the stock flow system of the paper machine.

It is to be understood that minor changes and modifications may be made to the specific details of this invention as disclosed herein which are obvious and which are intended to be included within the scope of the following claims.

I claim:
1. The method of controlling the growth of paper mill slime microorganisms on a paper machine comprising inserting at least one pair of spaced electrodes into the flowing water of the stock flow system of the paper machine, periodically measuring the electric potential produced between the electrodes to obtain an indication of microorganism activity, and in response to a potential measurement in excess of 40 millivolts adding an effective amount of chemical toxicant to the environment.

2. The method of claim 1, wherein the stock employed in the paper machine is unbleached kraft pulp, and the electrodes are placed in the white water flowing in the suction box seal pit.

References Cited

UNITED STATES PATENTS

| 2,269,393 | 1/1942 | Crampton | 210—62 |
| 2,999,797 | 9/1961 | Campbell | 210—62 X |
| 3,228,799 | 1/1966 | Rohrback | 136—86 X |
| 3,234,562 | 2/1966 | Bell et al. | 204—1.1 |
| 3,305,399 | 2/1967 | Davis | 136—86 |

S. LEON BASHORE, *Primary Examiner.*